US011928601B2

United States Patent
Alon et al.

(10) Patent No.: US 11,928,601 B2
(45) Date of Patent: Mar. 12, 2024

(54) NEURAL NETWORK COMPRESSION

(71) Applicant: Google LLC, Mountain View, CA (US)

(72) Inventors: Yair Alon, Mountain View, CA (US); Elad Eban, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 1360 days.

(21) Appl. No.: 15/892,890

(22) Filed: Feb. 9, 2018

(65) Prior Publication Data

US 2019/0251445 A1 Aug. 15, 2019

(51) Int. Cl.
  *G06N 3/084* (2023.01)
  *G06N 3/044* (2023.01)
  *G06N 3/08* (2023.01)
  *G06N 7/01* (2023.01)
  *G06N 20/00* (2019.01)
  *G06N 3/063* (2023.01)

(52) U.S. Cl.
  CPC .......... *G06N 3/084* (2013.01); *G06N 3/044* (2023.01); *G06N 3/08* (2013.01); *G06N 7/01* (2023.01); *G06N 3/063* (2013.01); *G06N 20/00* (2019.01)

(58) Field of Classification Search
  CPC ........ G06N 3/084; G06N 3/0445; G06N 3/08; G06N 7/005; G06N 3/063
  See application file for complete search history.

(56) References Cited

U.S. PATENT DOCUMENTS 10,776,368 B1 * 9/2020 Caragea .............. G06F 16/2462
2018/0137564 A1 * 5/2018 Swamy ................ G06Q 40/025

OTHER PUBLICATIONS

Ullrich, Karen, Edward Meeds, and Max Welling. "Soft weight-sharing for neural network compression." arXiv preprint arXiv:1702.04008 (2017). (Year: 2017).*
Chen, Wenlin, et al. "Compressing convolutional neural networks." arXiv preprint arXiv:1506.04449 (2015). (Year: 2015).*
Grønlund, Allan, et al. "Fast exact k-means, k-medians and Bregman divergence clustering in 1D." arXiv preprint arXiv:1701.07204 (2017). (Year: 2017).*

(Continued)

*Primary Examiner* — Michael J Huntley
*Assistant Examiner* — Sehwan Kim
(74) *Attorney, Agent, or Firm* — Fish & Richardson P.C.

(57) ABSTRACT

Methods, systems, and apparatus, including computer programs encoded on a computer storage medium, for neural network compression. In one aspect, a method comprises receiving a neural network and identifying a particular set of multiple weights of the neural network. Multiple anchor points are determined based on current values of the particular set of weights of the neural network. The neural network is trained by, at each of multiple training iterations, performing operations comprising adjusting the values of the particular set of weights by backpropagating gradients of a loss function. The loss function comprises a first loss function term based on a prediction accuracy of the neural network and a second loss function term based on a similarity of the current values of the particular set of weights to the anchor points. After training, the values of the particular set of weights are quantized based on the anchor points.

20 Claims, 3 Drawing Sheets

(56) References Cited

OTHER PUBLICATIONS

Wang, Liwei, Alexander Schwing, and Svetlana Lazebnik. "Diverse and accurate image description using a variational auto-encoder with an additive gaussian encoding space." Advances in Neural Information Processing Systems 30 (2017). (Year: 2017).*
Somers, Mark, and Joe Whittaker. "Quantile regression for modelling distributions of profit and loss." European Journal of Operational Research 183.3 (2007): 1477-1487. (Year: 2007).*
Mayout, "Compute the average for quantiles", StackOverflow, Oct. 2013. (Year: 2013).*
Piketty, Thomas, and Emmanuel Saez. "How progressive is the US federal tax system? A historical and international perspective." Journal of Economic perspectives 21.1 (2007): 3-24. (Year: 2007).*
Gan, Dahua, et al. "Enhancing short-term probabilistic residential load forecasting with quantile long-short-term memory." The Journal of Engineering 2017.14 (2017): 2622-2627. (Year: 2017).*
Vorbis, "Normal distribution", Wikipedia, Feb. 8, 2018. (Year: 2018).*
GKFX, "Gaussian function", Wikipedia, Feb. 6, 2018. (Year: 2018).*
Lei, Wang, Huawei Chen, and Yixuan Wu. "Compressing deep convolutional networks using k-means based on weights distribution." Proceedings of the 2nd International Conference on Intelligent Information Processing. 2017. (Year: 2017).*
See, Abigail, Minh-Thang Luong, and Christopher D. Manning. "Compression of neural machine translation models via pruning." arXiv preprint arXiv:1606.09274 (2016). (Year: 2016).*
Han, Song, Huizi Mao, and William J. Dally. "Deep compression: Compressing deep neural networks with pruning, trained quantization and huffman coding." arXiv preprint arXiv:1510.00149 (2015). (Year: 2015).*
PCT International Preliminary Report on Patentability in International Application No. PCT/US2018/017168, dated Aug. 11, 2020, 8 pages.
Cheng et al, "A Survey of Model Compression and Acceleration for Deep Neural Networks" IEEE Signal Processing Magazine, Dec. 13, 201, 10 pages.
PCT International Search Report and Written Opinion in International Application No. PCT/US2019/017168, dated May 17, 2019, 14 pages.
Ullrich et al, "Soft Weight-Sharing for Neural Network Compression", arXiv, Feb. 13, 2017, 16 pages.
PCT International Written Opinion in International Application No. PCT/US2019/017168, dated Aug. 2, 2019, 6 pages.

* cited by examiner

NEURAL NETWORK COMPRESSION

BACKGROUND

This specification relates to neural network compression.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that performs neural network compression.

According to a first aspect there is provided a method for neural network compression, the method comprising: receiving a neural network; identifying a particular set of multiple weights of the neural network; determining multiple anchor points based on current values of the particular set of weights of the neural network; training the neural network by, at each of multiple training iterations, performing operations comprising adjusting the values of the particular set of weights by backpropagating gradients of a loss function, wherein the loss function comprises: a first loss function term based on a prediction accuracy of the neural network; and a second loss function term based on a similarity of the current values of the particular set of weights to the anchor points; and quantizing the values of the particular set of weights, comprising, for each weight of the particular set of weights: determining an anchor point corresponding to the weight; and setting the value of the weight to the anchor point.

In some implementations, training the neural network comprises, at each of one or more of the training iterations: updating the multiple anchor points based on the current values of particular set of weights.

In some implementations, the second loss function term comprises a sum, over the particular set of weights, of a minimum distance between the current value of the weight and a corresponding anchor point.

In some implementations, determining the anchor points based on the current values of the particular set of weights comprises: fitting a mixture model to a distribution of the current values of the particular set of weights; and determining the anchor points based on parameters of components of the mixture model.

In some implementations, the mixture model is a Gaussian mixture model, and the anchor points are determined based on mean parameters of the components of the Gaussian mixture model.

In some implementations, the components of the Gaussian mixture model are restricted to have a fixed standard deviation.

In some implementations, determining the anchor points based on the current values of the particular set of weights comprises: determining multiple quantiles of the current values of the particular set of weights; and determining the anchor points based on the quantiles.

In some implementations, determining the anchor points based on the quantiles comprises determining the anchor points to be mid-points between the quantiles.

In some implementations, determining the anchor points based on the quantiles comprises determining the anchor points to be averages of the current values of the particular set of weights that are between each adjacent pair of quantiles.

In some implementations, the neural network is pre-trained to perform a prediction task.

According to a second aspect, there is provided a system comprising one or more computers and one or more storage devices storing instructions that when executed by the one or more computers cause the one or more computers to perform operations comprising implementing the described method.

According to a third aspect, there is provided one or more computer storage media storing instructions that when executed by one or more computers cause the one or more computers to perform operations comprising implementing the described method.

Particular embodiments of the subject matter described in this specification can be implemented so as to realize one or more of the following advantages.

The training system as described in this specification can generate a compressed neural network (i.e., a neural network with quantized weight values) that can effectively perform prediction tasks while having a reduced memory footprint (e.g., occupying less space in a logical data storage area or physical data storage device) compared to conventional neural networks (i.e., neural networks without quantized weight values). Therefore the training system as described in this specification enables more efficient use of computational resources (in particular, memory resources). As a result, the compressed neural networks generated by the training system as described in this specification can more readily be deployed to resource-constrained environments, such as mobile devices, than conventional neural networks. This is a technical improvement in the field of machine learning.

The training system as described in this specification can generate a family of multiple compressed neural networks, each with the same architecture and configured to perform the same prediction task, but each with different memory footprints and prediction accuracies. When a neural network has to be deployed to an environment (e.g., a smartwatch), the compressed network with memory footprint and prediction accuracy best suited to the environment can be immediately selected for deployment. On the other hand, in the absence of the family of compressed neural networks, multiple different neural networks with different hand-crafted architectures chosen to satisfy the memory constraints of the environment would be generated and trained in order to find a neural network suitable for deployment to the environment. Each of the family of compressed neural networks generated by the training system as described in this specification, however, uses a same architecture. Therefore, the training system as described in this specification can enable more efficient use of computational resources (e.g., memory and computing power) by obviating the need to hand-craft and train multiple different neural networks for different environments. This is another technical improvement in the field of machine learning.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The technology in this patent application is related to a method for neural network compression. Specifically, for a given neural network, the neural network is trained in accordance with a loss function that simultaneously: (i) encourages the neural network to generate accurate prediction outputs, and (ii) encourages each of the weight values of the neural network to approach a predetermined number of anchor points. After the neural network is trained, each of the weight values of the neural network is quantized, that is, replaced by the value of a corresponding anchor point. When the weight values of the neural network are quantized, they include only as many unique values as the number of anchor points, thereby reducing the memory footprint of the neural network. In some implementations the memory footprint of a neural network model may be thus reduced to enable the model to be deployed in a resource constrained environment such as a mobile device. The amount by which the memory footprint of the neural network is compressed is controlled by selecting the number of anchor points (e.g., fewer anchor points results in more compression).

These features and other features are described in more detail below.

Figure 1:
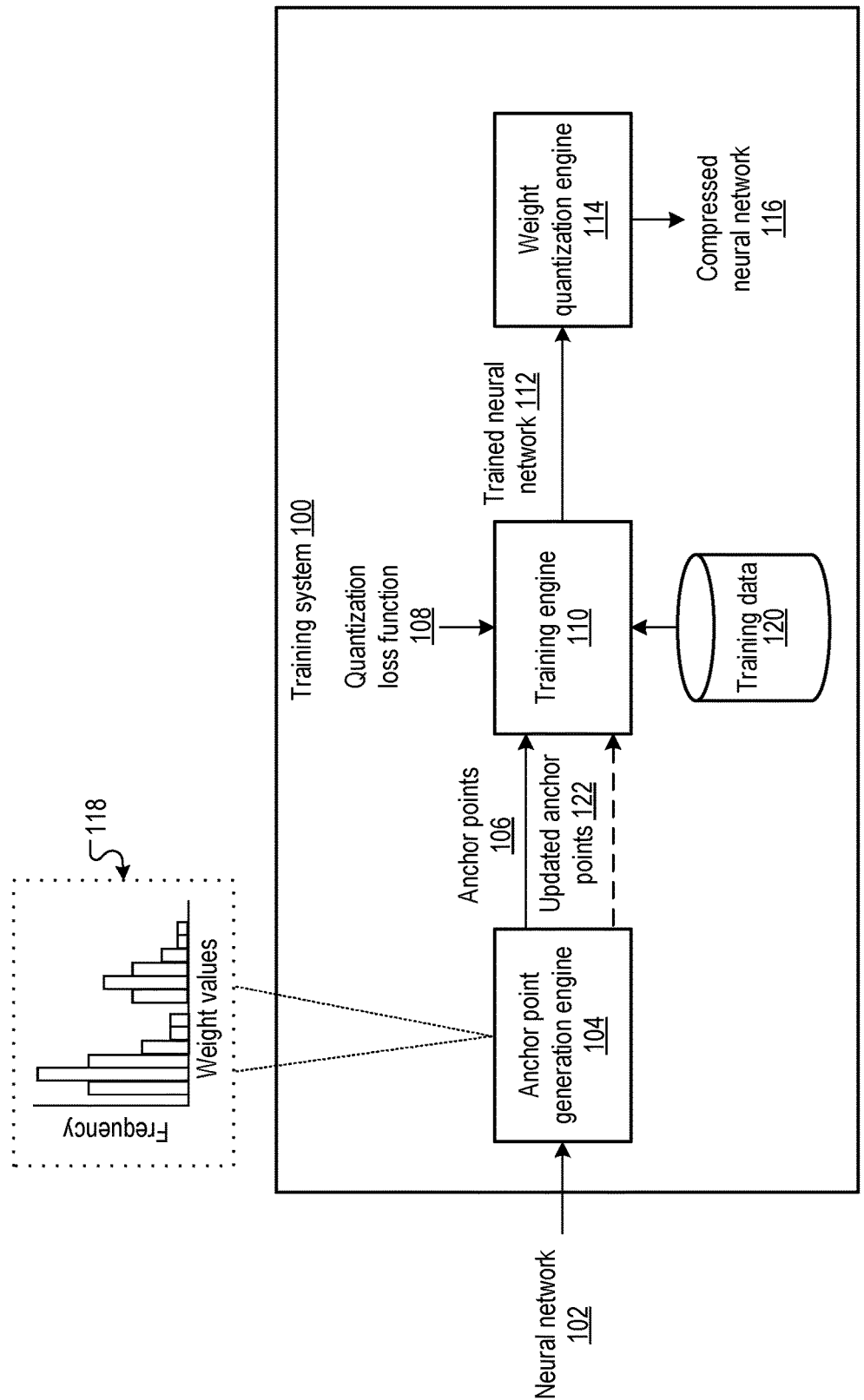
FIG. 1 is an illustration of an example training system.

FIG. 1 shows an example training system 100. The training system 100 is an example of a system implemented as computer programs on one or more computers in one or more locations in which the systems, components, and techniques described below are implemented.

The training system 100 is configured to receive as input a neural network 102 and to generate as output a corresponding compressed neural network 116.

The compressed neural network 116 has the same architecture (i.e., configuration of network layers) as the neural network 102, the same number of weights (e.g., scalar-valued learnable network parameters that scale the outputs of neurons of the network) as the neural network 102, and is configured to perform the same prediction task as the neural network 102. However, the weight values of the compressed neural network 116 include at most a predetermined number of unique values, referred to in this specification as anchor points 106. On the other hand, the weight values of the neural network 102 can include as many unique values as the number of weights (e.g., if each weight of the neural network 102 has a different weight value).

Since each of the weight values of the compressed neural network 116 is given by an anchor point, the weight values of the compressed neural network 116 can be stored (e.g., in a logical data storage area or physical data storage device) more efficiently (e.g., using fewer bits) than the weight values of the neural network 102.

For example, the weight values of the compressed neural network 116 can be represented and stored as a table of pointers and a table of anchor points. A pointer refers to data that references a location in a memory (i.e., a memory address). The table of pointers includes a different pointer for each weight of the compressed neural network 116. For a given weight, the pointer corresponding to the weight references the location in the table of anchor points that contains the value of the given weight. On the other hand, storing the weight values of the neural network 102 may require a table of weight values with a different entry for each weight of the neural network 102. Because a pointer can, in some cases, be stored using less memory (e.g., fewer bits) than a weight value, the weight values of the compressed neural network 116 can be stored more efficiently than those of the neural network 102, particularly when the number of anchor points is much less than the number of weights of the compressed neural network 116.

In general, the neural network 102 includes multiple neural network layers. The neural network 102 generates neural network outputs from neural network inputs by processing the neural network inputs through each of the layers. The neural network 102 can be a feed-forward neural network (e.g., a multi-layer perceptron or a convolutional neural network), a recurrent neural network (e.g., a long short-term memory network), or any other kind of neural network.

The neural network 102 can be configured to receive any kind of digital data input and to generate any kind of prediction (e.g., score or classification) output based on the input. A few examples follow.

For example, if the inputs to the neural network 102 are images or features that have been extracted from images, the output generated by the neural network 102 for a given image may be scores for each of a set of object categories, with each score representing an estimated likelihood that the image contains an image of an object belonging to the category.

As another example, if the inputs to the neural network 102 are Internet resources (e.g., web pages), documents, or portions of documents or features extracted from Internet resources, documents, or portions of documents, the output generated by the neural network 102 for a given Internet resource, document, or portion of a document may be a score for each of a set of topics, with each score representing an estimated likelihood that the Internet resource, document, or document portion is about the topic.

As another example, if the inputs to the neural network 102 are features of a personalized recommendation for a user, e.g., features characterizing the context for the recommendation, e.g., features characterizing previous actions taken by the user, the output generated by the neural network 102 may be a score for each of a set of content items, with each score representing an estimated likelihood that the user will respond favorably to being recommended the content item.

As another example, if the input to the neural network 102 is text in one language, the output generated by the neural network 102 may be a score for each of a set of pieces of text in another language, with each score representing an estimated likelihood that the piece of text in the other language is a proper translation of the input text into the other language.

As another example, if the input to the neural network 102 is a spoken utterance, a sequence of spoken utterances, or features derived from one of the two, the output generated by the neural network 102 may be a score for each of a set of pieces of text, each score representing an estimated likelihood that the piece of text is the correct transcript for the utterance or sequence of utterances.

As another example, the neural network 102 can be part of an auto-completion system or part of a text processing system.

As another example, the neural network 102 can be part of a reinforcement learning system and can generate outputs used for selecting actions to be performed by an agent interacting with an environment.

The example neural network applications described above are not exhaustive, and other applications for the neural networks generated as described in this written description may also be used.

The system 100 provides the neural network 102 as input to an anchor point generation engine 104 that is configured to receive a neural network as input and to process the weight values of the received neural network to generate a predetermined number of scalar-valued anchor points 106 as output. The anchor point generation engine 104 generates anchor points based on the distribution 118 of the weight values of the received neural network. The anchor point generation engine 104 may generate the anchor points 106 so that most or all weight values of the received neural network are reasonably close to at least one anchor point. For example, the anchor point generation engine 104 may generate the anchor points 106 by fitting a mixture model (e.g., a Gaussian mixture model) to the set of weight values of the received neural network, and determine the anchor points based on the parameters of the components of the mixture model (e.g., the mean parameters of the components of a Gaussian mixture model), as will be described in more detail later.

The system 100 provides the neural network 102 and anchor points 106 to a training engine 110 that is configured to receive a neural network and a set of anchor points as input. The training engine 110 trains the received neural network using a neural network training technique (e.g., stochastic gradient descent) based on a quantization loss function 108. As will be described in more detail later, training the received neural network based on the quantization loss function 108 simultaneously: (i) encourages the received neural network to generate accurate prediction outputs, and (ii) encourages each of the weight values of the received neural network to approach (i.e., get closer to) one or more of the anchor points. In general, the training engine 110 trains the received neural network for multiple training iterations until a training termination criterion is met. For example, the training termination criterion may be that the training engine 110 has trained the received neural network for predetermined number of training iterations. As another example, the training termination criterion may be that the change in the value of the quantization loss function 108 between training iterations falls below a predetermined threshold.

The training engine 110 trains the received neural network using a set of training data 120. The training data 120 includes multiple training examples. Each training example includes an input and a corresponding target output. The target output corresponding to an input is the output that the neural network 102 should generate by processing the input.

In some implementations, once the training engine 110 has trained the neural network 102 until the training termination criterion is met, the system 100 provides the resulting trained neural network 112 and the anchor points 106 as input to a weight quantization engine 114 (to be described later).

In some other implementations, once the training engine 110 has trained the neural network 102 until the training termination criterion is met, the system determines updated anchor points 122 for neural network 102 using the anchor point generation engine 104. In general, the values of the updated anchor points 122 are different from the anchor points 106 since training the neural network 102 (i.e., by the training engine 110) causes the distribution of its weight values to change. However, the number of updated anchor points 122 is the same as the number of original anchor points 106.

In these implementations, the system 100 iterates multiple times between training the neural network 102 using the training engine 110 and updating the anchor points using the anchor point generation engine 104 until an iteration termination criterion is met. For example, the iteration termination criterion may be that the system 100 has performed a predetermined number of iterations. As another example, the iteration termination criterion may be that the differences between the updated anchor points generated between iterations falls below a predetermined threshold.

In these implementations, once the iteration termination criterion is met, the system 100 provides the resulting trained neural network 112 and the anchor points determined for the trained neural network 112 as input to the weight quantization engine 114.

The weight quantization engine 114 is configured to receive as input a trained neural network 112 and corresponding anchor points determined for the trained neural network 112, and to process the inputs to generate the compressed neural network 116. Specifically, for each weight of the trained neural network 112, the weight quantization engine 114 determines an anchor point (i.e., from the received anchor points) corresponding to the weight (e.g., the anchor point closest to the weight value), and sets the weight value to the value of the corresponding anchor point. Thereby, the compressed neural network 116 has a number of unique weight values that is at most the number of anchor points.

In general, for a given input, the compressed neural network 116 may generate a different output that the trained neural network 112. However, if the number of anchor points is chosen to be sufficiently large, then the prediction performance (i.e., accuracy) of the compressed neural network 116 is similar to that of the trained neural network 112. In particular, if each of the weight values of the trained neural network 112 is close to an anchor point (as encouraged by the quantization loss function 108), then the weight values of the compressed neural network 116 are similar to those of the trained neural network 112, resulting in the trained neural network 112 and the compressed neural network 116 generating similar outputs (and thereby having similar prediction performance). As used in this written description, the performance of the trained neural network 112 and the compressed neural network 116 are similar when respective measures of their performance (e.g., as measured by a loss function) are similar.

Figure 2:
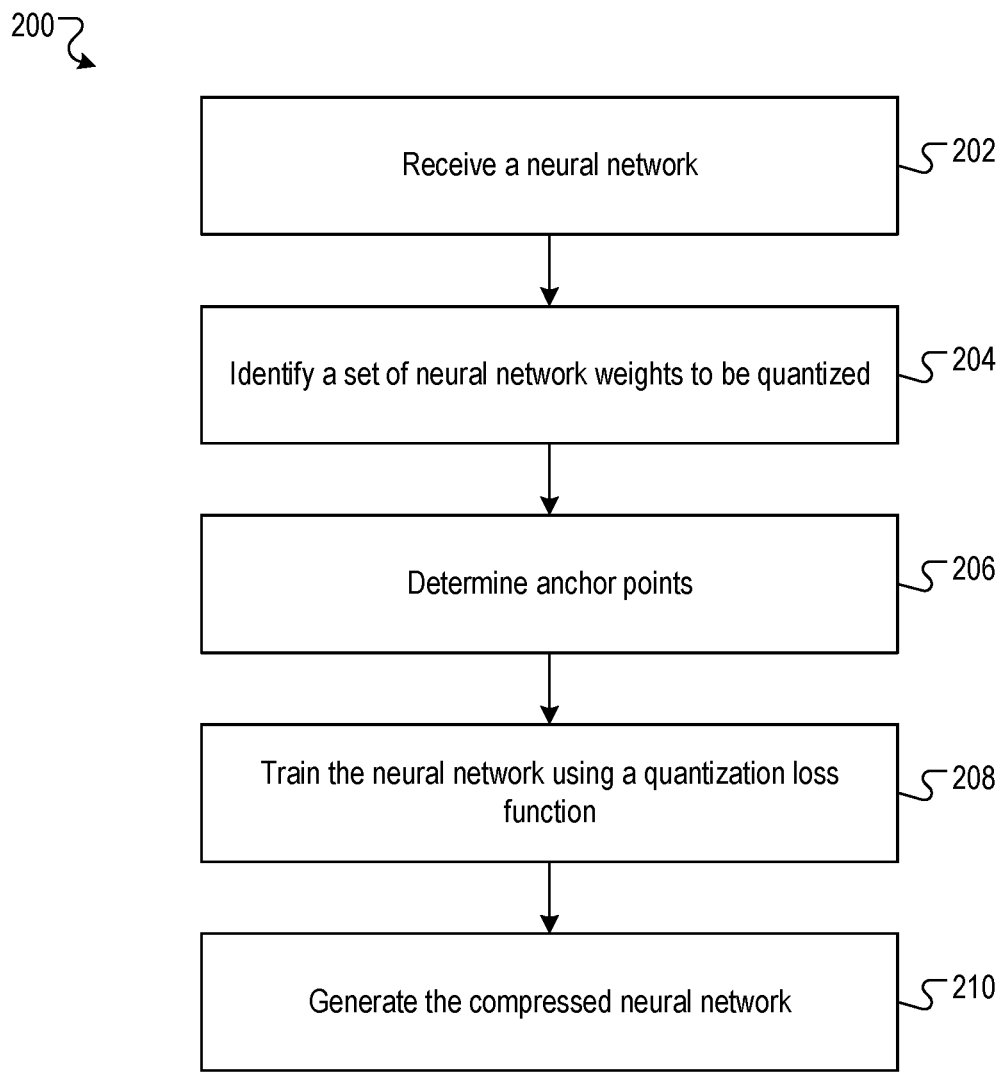
FIG. 2 is a flow diagram of an example process for generating a compressed neural network.

FIG. 2 is a flow diagram of an example process for generating a compressed neural network. For convenience, the process 200 will be described as being performed by a system of one or more computers located in one or more locations. For example, a training system, e.g., the training system 100 of FIG. 1, appropriately programmed in accordance with this specification, can perform the process 200.

The system receives a neural network (202). The neural network can be configured to receive any kind of digital data input and to generate any kind of prediction (e.g., score or classification) output based on the input. The neural network can be a feed-forward neural network (e.g., a multi-layer perceptron or a convolutional neural network), a recurrent neural network (e.g., a long short-term memory network), or any other kind of neural network.

In some cases, the neural network is pre-trained, that is, the weight values of the neural network have been tuned to improve the performance of the neural network on its prediction task. In some other cases, the neural network is not pre-trained. In these cases, the weight values of the neural network may be initialized to an arbitrary value (e.g., the value zero), or the weight values may be initialized randomly (e.g., each of the weight values may be sampled from a Gaussian distribution).

The system identifies a set of neural network weights to be quantized (204). In some implementations, the system identifies all the weights of the neural network as weights to be quantized. In some other implementations, the system identifies a proper subset of the weights of the neural network as weights to be quantized. For example, the system may determine that the bias and scale factor parameters of batch normalization layers are not to be quantized. In the following, the weight values of the neural network refers to the values of the weights that are to be quantized.

The system determines anchor points (206). The number of anchor points is predetermined and each of the anchor points is a scalar value. The system determines the anchor points based on the distribution of the weight values of the neural network. In general, the system selects anchor points so that most or all weight values of the neural network are reasonably close to at least one anchor point.

In some implementations, the system determines the anchor points by fitting (e.g., using an appropriate optimization method) a mixture model to the weight values of the neural network. Fitting a mixture model to the weight values of the neural network refers to identifying the parameters of a probability distribution that models the distribution of the weight values. The probability distribution is a combination of multiple component probability distributions and identifying the parameters of the probability distribution includes identifying the parameters of each of the multiple component probability distributions. In general, the system selects the number of component probability distributions to be equal to the number of anchor points, and the system determines the values of the anchor points based on parameters of the respective component probability distributions.

For example, the system may fit a Gaussian mixture model to the weight values of the neural network. A Gaussian mixture model is a mixture model where each of the component probability distributions are Gaussian distributions. The parameters of a Gaussian distribution include the mean of the distribution. In this example, the system may determine the value of each anchor point to be equal to the mean parameter of the Gaussian probability distribution that is the component of the Gaussian mixture model corresponding to the anchor point.

Also in this example, the system may regularize the standard deviation parameters of the component Gaussian probability distributions during the fitting to reduce the likelihood that the standard deviation parameters of the fitted component Gaussian probability distributions have low values. In some cases, the system imposes the constraint that the standard deviation parameters of component Gaussian probability distributions have the same value. In some cases, the system lower bounds the standard deviation parameter of each component Gaussian probability distribution during fitting by a predetermined value. In some cases, the system adds a predetermined value to the standard deviation parameter of each component Gaussian probability distribution during fitting.

In some cases, the system fits the mixture model to the weight values of the neural network using an optimization algorithm that includes steps where parameters of the algorithm are determined stochastically. In these cases, fitting a mixture model to the weight values multiple times may generate a different fitted mixture model (i.e., a mixture model with different parameter values) each time. Therefore, the system may fit the mixture model to the weight values multiple times to generate multiple different fitted mixture models, and determine the anchor points (as described earlier) based on the particular fitted mixture model that is determined to best explain the weight values (e.g., using a statistical goodness of fit test).

In some other implementations, the system determines a set of quantiles of the weight values of the neural network and determines the anchor points based on the quantiles.

A set of quantiles of the weight values is a set of scalar values $\{q_i\}_{i=0}^{K}$, where K is a positive integer, and where for each index i, a fraction i/K of the weight values are less than or equal to $q_i$. For example, if K=3, then none of the weight values are less than or equal to $q_0$, ⅓ of the weight values are less than or equal to $q_1$, ⅔ of the weight values are less than or equal to $q_2$, and all of the weight values are less than or equal to $q_3$. Since the number of weight values is finite, for any particular quantile $q_i$, the fraction of the weight values that are less than or equal to $q_i$ may be only approximately equal to i/K.

In some of these implementations, the system determines the anchor points to be the midpoints between the quantiles of the weight values. For example, the anchor points $\{a_i\}_{i=1}^{K}$ may be given by:

$$a_i = \frac{1}{2}(q_i - q_{i-1}), i = 1, \ldots, K$$

In some of these implementations, the system determines the anchor points to be the means of the weight values that are between each adjacent pair of quantiles. For example, the anchor points $\{a_i\}_{i=1}^{K}$ may be given by:

$$a_i = \frac{1}{K} \sum_{\{w_j \in [v_{i-1}, v_i)\}} w_j, i = 1, \ldots, K$$

where $\{w_j\}_{j=1}^{J}$ are the weight values of the neural network.

When the system selects the anchor points using either of the described implementations based on the quantiles of the weight values, each anchor point is close to approximately 1/K of the weight values, where the number of quantiles is (K+1).

The system trains the neural network using a quantization loss function (208). Training the neural network using the quantization loss function simultaneously: (i) encourages the neural network to generate accurate prediction outputs, and (ii) encourages each of the weight values of the neural network to approach (i.e., get closer to) one or more of the anchor points. An example process for training a neural network based on a quantization loss function is described with reference to FIG. 3.

The system generates the compressed neural network by quantizing the weight values of the trained neural network to the anchor points (210). Specifically, for each weight value of the trained neural network, the system determines an anchor point that corresponds to the weight value and replaces the weight value by the value of the corresponding anchor point. In general, the system determines the anchor point corresponding to a weight value to be the anchor point with the value that is closest to the weight value.

Figure 3:
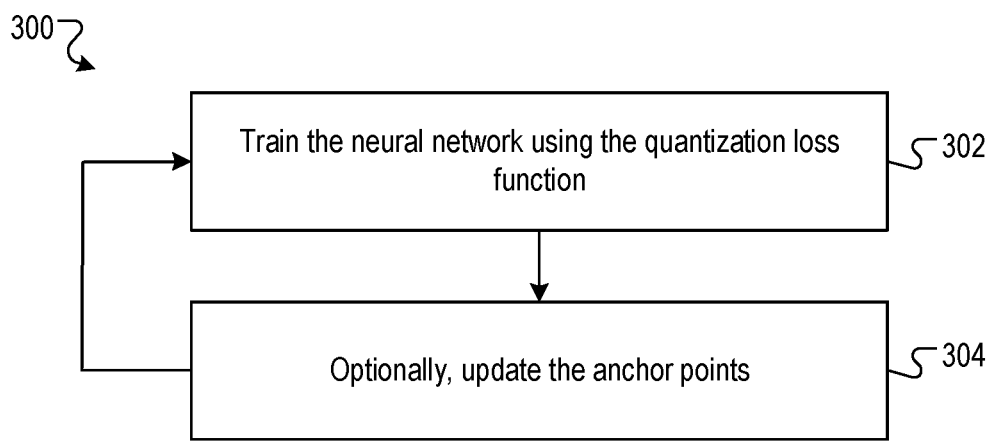
FIG. 3 is a flow diagram of an example process for training a neural network based on a quantization loss function.

FIG. 3 is a flow diagram of an example process for training a neural network based on a quantization loss function. For convenience, the process 300 will be described as being performed by a system of one or more computers located in one or more locations. For example, a training system, e.g., the training system 100 of FIG. 1, appropriately programmed in accordance with this specification, can perform the process 300.

The system trains the neural network for one or more training iterations using a neural network training technique (e.g., stochastic gradient descent) (302). Specifically, the system computes gradients of a quantization loss function with respect to the weight values of the neural network, and backpropagates the gradients to adjust the weight values.

Training the neural network based on the quantization loss function simultaneously: (i) encourages the neural network to generate accurate prediction outputs, and (ii) encourages each of the weight values of the neural network to approach (i.e., get closer to) one or more of the anchor points. One example of a quantization loss function is given by:

$$\mathcal{L}(W) = \mathcal{L}_{pred}(W) + \lambda \sum_{w \in W} \min_{\{a_i\}} (w - a_i)^2,$$

where W are the weights of the neural network, $\mathcal{L}_{pred}(W)$ is a term that encourages the neural network to generate accurate prediction outputs (for example, a cross-entropy loss term or a squared-error loss term), $\lambda$ is a hyper-parameter (selected, for example, by a cross-validation hyper-parameter selection process), and $\{a_i\}$ are the anchor points. A different example of a quantization loss function is given by:

$$\mathcal{L}(W) = \mathcal{L}_{pred}(W) + \lambda \sum_{w \in W} \min_{\{a_i\}} \exp(w - a_i),$$

where the notation is defined as earlier.

The system trains the neural network until a termination criterion is met. In some cases, the termination criterion is that the system has trained the neural network for a predetermined number of training iterations. In some cases, the termination criterion may be that the change in the value of the quantization loss function between training iterations falls below a predetermined threshold.

Optionally, in some implementations, the system may update the anchor points (304) and return to step 302, where the neural network is trained using the quantization loss function based on the updated anchor points. In general, the values of the updated anchor points are different from the previous anchor points since training the neural network causes the distribution of its weight values to change. In these implementations, the system continues to iterate between (i) training the neural network using the quantization loss function and (ii) updating the anchor points, until a termination criterion is met. In some cases, the termination criterion is that the system has performed a predetermined number of iterations. In some cases, the termination criterion is that the differences between the updated anchor points generated between iterations falls below a predetermined threshold.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for neural network compression, the method comprising:
receiving a neural network;
identifying a set of weights of the neural network;
determining initial values of a set of anchor points based on initial values of the set of weights of the neural network;
training the neural network by, at each of multiple training iterations, performing operations comprising:
adjusting current values of the set of weights of the neural network at the training iteration by back-propagating gradients of a loss function, wherein the loss function comprises:
a first loss function term based on a prediction accuracy of the neural network; and
a second loss function term based on a similarity of the current values of the set of weights of the neural network at the training iteration to current values of the set of anchor points at the training iteration; and
adjusting the current values of the set of anchor points at the training iteration based on the current values of the set of weights of the neural network at the training iteration, the adjusting comprising:
determining a set of quantiles of the current values of the set of weights of the neural network at the training iteration; and
setting, for each of one or more anchor points in the set of anchor points, a current value of the anchor point equal to a statistic of current values of a plurality of weights of the neural network that are included in an interval defined by a respective pair of quantiles from the set of quantiles;
quantizing the current values of the set of weights of the neural network, comprising, for each weight of the set of weights of the neural network:
determining an anchor point in the set of anchor points corresponding to the weight; and
setting a current value of the weight to a current value of the corresponding anchor point.

2. The method of claim 1, wherein the second loss function term comprises a sum, over the set of weights, of a minimum distance between the current value of the weight and the current value of a corresponding anchor point.

3. The method of claim 1, wherein determining the initial values of the set of anchor points based on the initial values of the set of weights comprises:
fitting a mixture model to a distribution of the initial values of the set of weights; and
determining the initial value of each anchor point in the set of anchor points based on parameters of components of the mixture model.

4. The method of claim 3, wherein the mixture model is a Gaussian mixture model, and the initial value of each anchor point is determined based on mean parameters of one or more components of the Gaussian mixture model.

5. The method of claim 4, wherein the components of the Gaussian mixture model are restricted to have a fixed standard deviation.

6. The method of claim 1, wherein the neural network is pre-trained to perform a prediction task.

7. The method of claim 1, wherein the neural network is a recurrent neural network.

8. The method of claim 1, wherein the neural network is configured to process an image to generate a respective score for each category in a set of categories.

9. The method of claim 1, wherein the neural network is configured to process text in one language to generate an output that characterizes a translation of the text into another language.

10. The method of claim 1, wherein setting, for each of one or more anchor points in the set of anchor points, the current value of the anchor point equal to the statistic of the current values of the plurality of weights of the neural network that are included in the interval defined by the respective pair of quantiles from the set of quantiles comprises, for each of one or more anchor points:
setting the current value of the anchor point equal to a mean of the current values of the plurality of weights of the neural network that are included in the interval defined by the respective pair of quantiles from the set of quantiles.

11. A system comprising one or more computers and one or more storage devices storing instructions that when executed by the one or more computers cause the one or more computers to perform operations comprising:
receiving a neural network;
identifying a set of weights of the neural network;
determining initial values of a set of anchor points based on initial values of the set of weights of the neural network;
training the neural network by, at each of multiple training iterations, performing operations comprising:
adjusting current values of the set of weights of the neural network at the training iteration by back-propagating gradients of a loss function, wherein the loss function comprises:
a first loss function term based on a prediction accuracy of the neural network; and
a second loss function term based on a similarity of the current values of the set of weights of the neural network at the training iteration to current values of the set of anchor points at the training iteration; and
adjusting the current values of the set of anchor points at the training iteration based on the current values of the set of weights of the neural network at the training iteration, the adjusting comprising:
determining a set of quantiles of the current values of the set of weights of the neural network at the training iteration; and
setting, for each of one or more anchor points in the set of anchor points, a current value of the anchor point equal to a statistic of current values of a plurality of weights of the neural network that are included in an interval defined by a respective pair of quantiles from the set of quantiles;
quantizing the current values of the set of weights of the neural network, comprising, for each weight of the set of weights of the neural network:
determining an anchor point in the set of anchor points corresponding to the weight; and
setting a current value of the weight to a current value of the corresponding anchor point.

12. The system of claim 11, wherein the second loss function term comprises a sum, over the set of weights, of a minimum distance between the current value of the weight and the current value of a corresponding anchor point.

13. The system of claim 11, wherein determining the initial values of the set of anchor points based on the initial values of the set of weights comprises:
   fitting a mixture model to a distribution of the initial values of the set of weights; and
   determining the initial value of each anchor point in the set of anchor points based on parameters of components of the mixture model.

14. The system of claim 13, wherein the mixture model is a Gaussian mixture model, and the initial value of each anchor point is determined based on mean parameters of one or more components of the Gaussian mixture model.

15. One or more non-transitory computer storage media storing instructions that when executed by one or more computers cause the one or more computers to perform operations comprising:
   receiving a neural network;
   identifying a set of weights of the neural network;
   determining initial values of a set of anchor points based on initial values of the set of weights of the neural network;
   training the neural network by, at each of multiple training iterations, performing operations comprising:
      adjusting current values of the set of weights of the neural network at the training iteration by back-propagating gradients of a loss function, wherein the loss function comprises:
         a first loss function term based on a prediction accuracy of the neural network; and
         a second loss function term based on a similarity of the current values of the set of weights of the neural network at the training iteration to current values of the set of anchor points at the training iteration; and
      adjusting the current values of the set of anchor points at the training iteration based on the current values of the set of weights of the neural network at the training iteration, the adjusting comprising:
         determining a set of quantiles of the current values of the set of weights of the neural network at the training iteration; and
         setting, for each of one or more anchor points in the set of anchor points, a current value of the anchor point equal to a statistic of current values of a plurality of weights of the neural network that are included in an interval defined by a respective pair of quantiles from the set of quantiles;
      quantizing the current values of the set of weights of the neural network, comprising, for each weight of the set of weights of the neural network:
         determining an anchor point in the set of anchor points corresponding to the weight; and
         setting a current value of the weight to a current value of the corresponding anchor point.

16. The non-transitory computer storage media of claim 15, wherein the second loss function term comprises a sum, over the set of weights, of a minimum distance between the current value of the weight and the current value of a corresponding anchor point.

17. The non-transitory computer storage media of claim 15, wherein determining the initial values of the set of anchor points based on the initial values of the set of weights comprises:
   fitting a mixture model to a distribution of the initial values of the set of weights; and
   determining the initial value of each anchor point in the set of anchor points based on parameters of components of the mixture model.

18. The non-transitory computer storage media of claim 17, wherein the mixture model is a Gaussian mixture model, and the initial value of each anchor point is determined based on mean parameters of one or more components of the Gaussian mixture model.

19. The non-transitory computer storage media of claim 18, wherein the components of the Gaussian mixture model are restricted to have a fixed standard deviation.

20. The non-transitory computer storage media of claim 15, wherein the neural network is pre-trained to perform a prediction task.

* * * * *